United States Patent [19]  [11] 4,394,895
Ginniff et al.  [45] Jul. 26, 1983

[54] FACILITIES FOR THE EXAMINATION OF RADIOACTIVE BODIES

[75] Inventors: Maurice E. Ginniff, Seascale; Eric K. Richardson, Sale, both of England

[73] Assignee: United Kingdom Atomic Energy Authority, London, England

[21] Appl. No.: 224,116

[22] Filed: Jan. 12, 1981

[30] Foreign Application Priority Data

Jan. 23, 1980 [GB] United Kingdom ................. 8002193

[51] Int. Cl.³ ...................... B65G 51/26; B65G 54/02
[52] U.S. Cl. ............................... 198/339; 104/138 R; 138/94.3; 138/97; 198/619; 406/191; 406/34
[58] Field of Search ....................... 198/339, 619, 805; 104/138 R, 138 G, 290–292; 138/94.3, 97; 406/34, 191

[56] References Cited

U.S. PATENT DOCUMENTS 394,161 12/1888 Dolles ............................ 104/138 R
595,890 12/1897 Pike ................................ 104/138 R
3,503,424 3/1970 Sawyer .................................. 138/97
3,860,038 1/1975 Formi ................................ 138/94.3
4,026,329 5/1977 Thompson ............................ 138/97
4,090,534 5/1978 Martin et al. ......................... 138/97
4,166,363 9/1979 Peyraud et al. ................. 198/619 X Primary Examiner—James G. Smith
Assistant Examiner—Douglas D. Watts
Attorney, Agent, or Firm—Larson and Taylor

[57] ABSTRACT

A facility for the examination of radioactive bodies in which carriages, each transporting one or more radioactive bodies, travel along a shielded passage to bring the bodies to examination stations spaced along the passage. The transverse sectional dimensions of the passage are not much larger than the corresponding dimensions of the carriages in order to maintain the radioactive region as small as possible. Equipment for the examination of the radioactive bodies is located outside the shielded passage.

3 Claims, 11 Drawing Figures

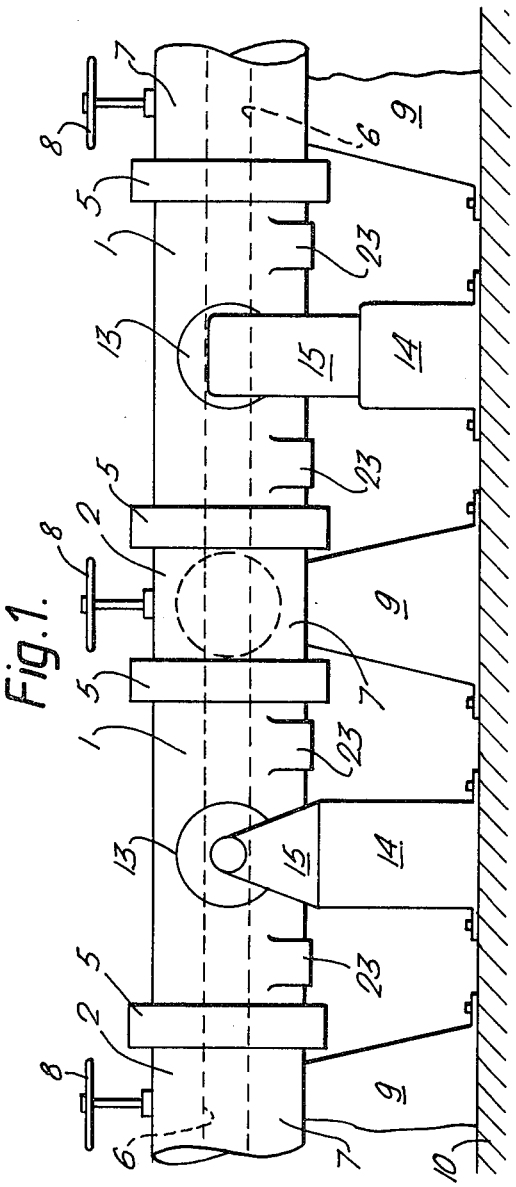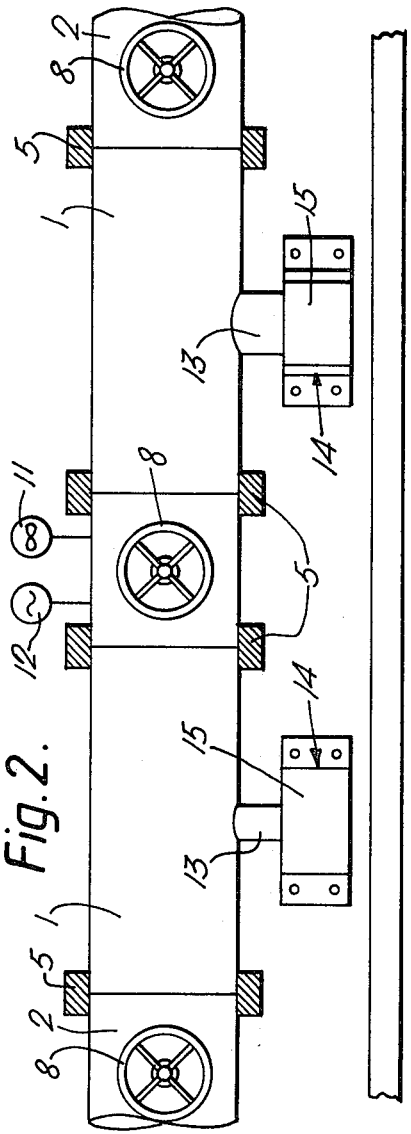

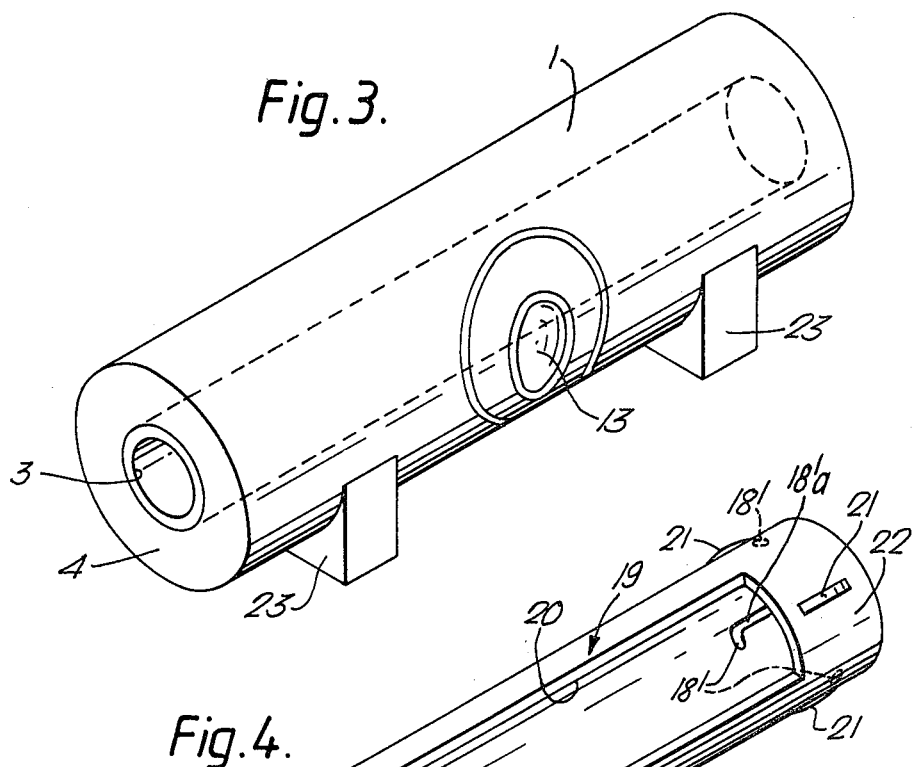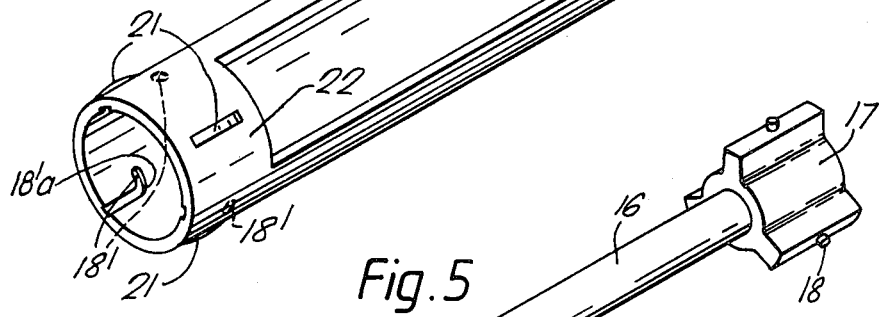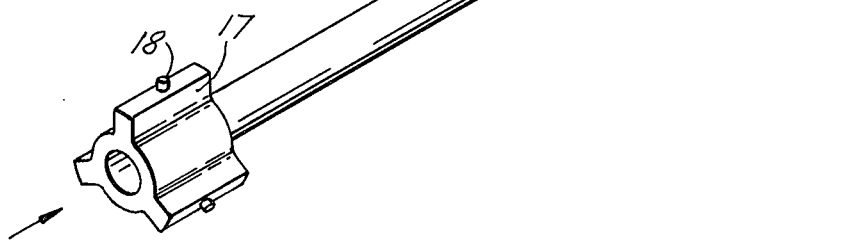

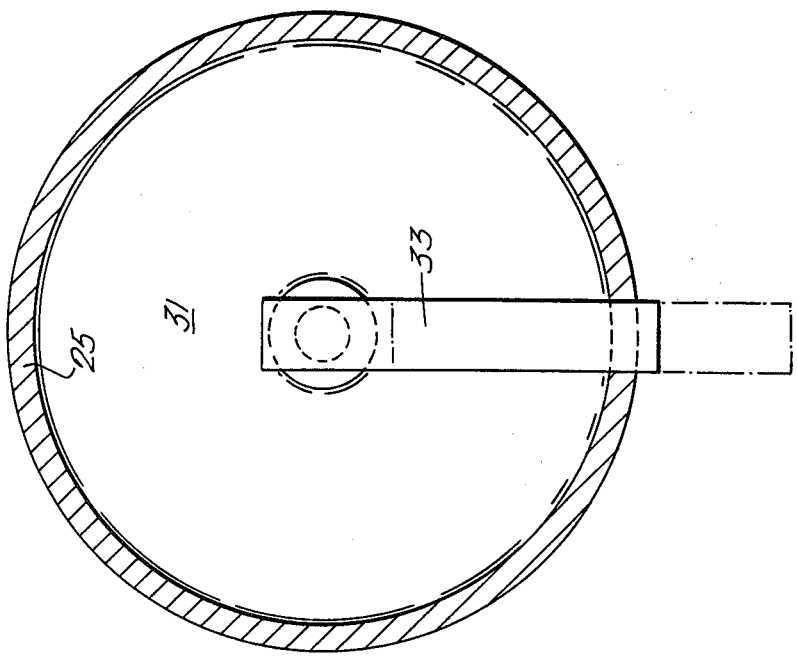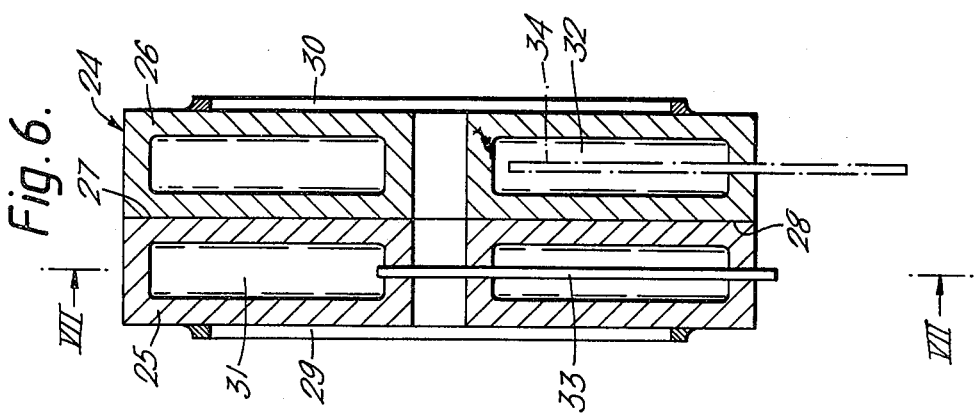

FACILITIES FOR THE EXAMINATION OF RADIOACTIVE BODIES

BACKGROUND OF THE INVENTION

This invention relates primarily to a facility for the examination of radioactive bodies, the term 'examination' being hereafter understood to include both destructive and non-destructive testing with all operations which said terms encompass.

One example of purpose for which the facility can be applied is metallurgical examination, such as by ultrasonics, radiography or other non-destructive testing means. Another example is mensuration by known means to identify changes in shape, dimension or weight. The radioactive bodies referred to may be objects which have been subject to neutron and other radiation, such as nuclear reactor fuel elements after discharge from the reactor.

Existing facilities for examination of radioactive bodies involve large shielded enclosures, termed 'caves' in the art, in which various examination techniques are carried out at successive stations by remote control. This involves providing and operating extremely complicated mechanism not only for examination but also for transport of the bodies betweem examination stations. Providing integrity of shielding for operators and maintaining an efficient ventilation system with 100% integrity are additional problems which make the provision and operation of such caves a very expensive undertaking. It is desirable to maintain the interior of the caves at a lower pressure than ambient to ensure that if leakage occurs it will be inward not outward, and extremely efficient filters can be incorporated in the ventilating system (which incorporates the pressure regulating system) to take care of airborne radioactivity.

It is an object of the present invention to provide a facility which is not only considerably less expensive than existing facilities but also provides considerable simplification of operation and alleviates the problems involved in providing complete integrity.

SUMMARY OF THE INVENTION

According to the invention, a facility for the examination of radioactive bodies comprises a movable carriage for one or more radioactive bodies, a shielded passage forming a path of travel for the carriage and having transverse sectional dimensions not much larger than the corresponding dimensions of the carriage and means for moving the carriage along the passage between a plurality of examination stations at which equipment for examining the body or bodies is located outside the shielding. Such stations conveniently comprise a plurality of spaced lateral tubular projections communicating with the interior of the passage.

The passage may be provided by a plurality of tubular units disposed end to end with sealing between units. Said units may include a part of the total shielding with which the passage is provided. Means may be provided for changing and replacing units under shielded and sealed conditions.

The said stations are provided with equipment which can be manually operated so as to make use of operator expertise or can be automatically operated eg by computer programme. Said equipment has its motive power or control units outside the shielded passage so that maintenance, repair and replacement can be readily effected.

The shielded passage may be linear (straight or curved as expedient), with provision for reversing the movement of said carriage to return it to a starting position, or may involve a parallel system with or without end switching, or may be endless so that carriage movement may be confined to a single direction. Where the passage is single linear, a storage position for examined bodies may be provided at one limit of carriage movement, the said storage position being such that stored radioactive bodies can be periodically removed to a more permanent storage facility.

The movement of said carriage may be effected in a number of alternative ways. The carriage may slide or roll in the passage, or may be levitated by air, liquid or magnetic force (repulsion or attraction). It may be moved longitudinally by a linear motor, or by sequentially operated magnetic repulsion and attraction, or by being releasably joined to a moving conveyor, or by being drawn along by a line on a drum. The last-named two expedients are subject to sealing difficulties at the ends of the passage where linear and where endless, where the drive to conveyor or drum penetrates the passage. Remotely operable expedients not involving breaching the sealed passage are therefore preferred.

Remotely operable means for moving the radioactive body or bodies relative to the carriage, for example rotating it about its own major axis, may be provided. Such means may be electrically operated and be controlled by a radio or other frequency signal generated external to the shielded passage.

DESCRIPTION OF THE DRAWINGS

A constructional example embodying the invention will now be described with reference to the accompanying drawings, wherein:

FIG. 1 is an elevation of part of a facility for the examination of radioactive bodies;

FIG. 2 is a plan view of FIG. 1,

FIG. 3 is a perspective view of one unit of those from which the facility shown in FIG. 1 is made up, FIG. 4 is a perspective view of a carriage of the facility shown in FIGS. 1-3, FIG. 5 is a perspective view of means supporting a radioactive body, said means cooperating with the carriage shown in FIG. 4, FIGS. 6 and 7 are enlarged fragmentary views showing means for sealing between units of the facility, one of which is shown in FIG. 3.

DESCRIPTION OF THE PREFERRED EMBODIMENTS

Figure 8:
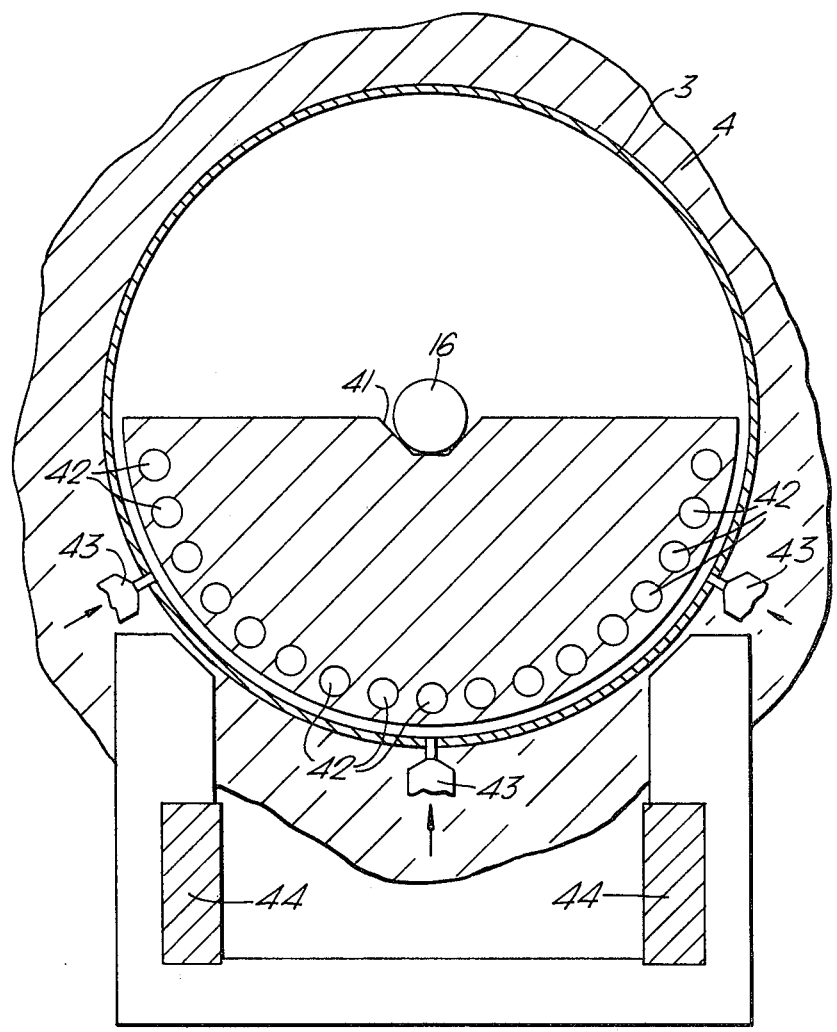
FIG. 8 is an enlarged end view of an alternative construction facility for the examination of radioactive bodies.

Referring first to FIGS. 1-7, a facility for the examination of radioactive bodies comprises a number of work units 1 disposed end to end with a number of service units 2, there being sealing joints between the units 1 and 2. Each work unit 1 comprises a circular-section tube 3 surrounded by a thick cylinder 4 of shielding material, eg lead. A collar 5, also of shielding material, covers each joint between units 1 and 2. Each service unit 2 comprises a tube 6 of the same internal diameter as tube 3 and having a cylindrical shield surround 7. Within the tube 6 there is an isolating valve (not shown) operated by an external control wheel 8. In an alternative, not shown, the valve may be operated remotely by a servo which does not involve any penetration of the tube 6, thus assisting in maintaining integrity. Each service unit 2 has a support 9 by means of which the facility is mounted on a floor 10. Furthermore, the unit 2 gives access for essential services such as a ventilation and extraction system and electric or other leads for the equipment for moving radioactive bodies along the units 1 and 2, subsequently to be described. Examples of such services are diagrammatically illustrated in FIG. 2 and designated 11 and 12.

A typical work unit 1 has a lateral tubular penetration 13 providing a work station 14 for equipment for inspecting or performing operations on the radioactive bodies. Such equipment is diagrammatically illustrated in FIGS. 1 and 2, designated 15. Examples of such equipment suitable for operations on and inspection of a radioactive body such as an irradiated fast reactor fuel pin are: mensuration equipment for dimensional inspection, mechanical or laser means for decladding and/or cutting the fuel and clad into specimens, and inspection equipment of various kinds such as for ultrasonic scanning, gamma ray spectroscopy analytical analysis, etc.

The radioactive bodies, an example being the cylindrical body 16 shown in FIG. 5, are presented in turn to the stations 14 by having mounted at each end an end fitting 17 having radial spigots 18 for engagement in corresponding bayonet slots 18' in the interior of a tubular carriage 19 having peripheral slots 20 enabling access to be gained to the body 16 by the equipment 15 at work stations 14. Each carriage 19 has external slide pads 21 spaced around its unslotted end regions 22 and the carriages 19 with slide pads 21 are a sliding fit in the tubes 3 and 6 of the work units and service units respectively. The carriage 19 with the body 16 and its end fittings 17 is moved between stations by any convenient expedient. For example each work unit 1 may have lateral projections 23 (see FIG. 3) disposed so that projections 23 along the facility comprising alternate units 1 and 2 are equidistantly spaced (see FIG. 1). Each projection 23 houses reluctance motor drive coils which are operated sequentially to cause the carriage 19 and its contents to be moved between work stations 14. In other alternatives, not shown, other electromagnetic expedients, or a conveyor or cable system may be employed to move the carriage 19. Instead of slide pads 21, the carriage may be supported by gas pressure or liquid for longitudinal movement along and within the tubes 3 and 6, or magnetic or electromagnetic support may be employed.

Typical nominal dimensions for a work unit 1 are: outside diameter of shielding 4: 0.60 m; internal diameter of tube 3: 0.10 m; length of until 1: 1.5 m.

It is envisaged that a work unit 1 can be removed from its position for repair or decontamination, and replaced by a stand-by unit 1. To this end, suitable sealing means between units 1 and 2 are provided and are illustrated in FIGS. 6 and 7. Such seal means 24 comprises two circular seals 25, 26 abutting over full circular faces 27, 28 respectively, with one seal 25 attached by annular rib 29 to a service unit 2 and the other seal 26 attached by an annular rib 30 to a work unit 1. Each seal 25, 26 has an annular compartment 31, 32 respectively, through which can penetrate a blade 33, 34 respectively, the blades serving to blank off the end of tubes 3, 6 of the respective work and service units 1, 2, see FIG. 7, when it is desired to separate these units for replacement of a work unit 1. The blades 33, 34 can be retracted to free the bores of tubes 3, 6 when the replacement unit is in correct position. The shield unit valve will also be operated by control wheel 8 when unit changing is being effected. It will also be necessary to bring up a supplementary shielding expedient (not shown) adapted to provide temporary cover against activity at the relevant joints whilst removal and replacement of a work unit 1 is being effected.

It will be appreciated that several work units 1 and service units 2 are assembled end to end in the alternate manner shown in FIGS. 1 and 2 to provide a facility of linear configuration. One end member of the assembly is adapted for feed-in of a radioactive body 16 and its supporting end fittings 17 to an empty carriage 19 at a feed station. Suitable shielding and environment control expedients are provided (not shown). At the other end of the facility, means are provided for removal of a body 16 and fittings 17 from a carriage 19 into either a continuous storage unit or into a suitable transport container for disposal as waste. The fittings 17 can be made of plastics and be considered as expendable after one use. The empty carriage 19 can be returned to the feed station either along the tubes 3 and 6 by reversing the drive system, or can be removed from the facility into a suitably shielded container for return to the feed station externally.

Other shapes of facility can be envisaged whilst still employing the present invention. For example, some or all of the work and service units can be curved and arranged in an endless configuration, either circular, or oval, or in any other suitable configuration. Feed and removal stations can then be adjacent. In another alternative, the facility can consist of two parallel linear configurations with change-over or cross-over provisions at the ends, one linear run being employed for examination of and operations on the radioactive bodies 16 and the other being employed merely to return carriages 19 to the feed station. With this alternative, it can be envisaged that several carriages 19 can be in use at the same time, thus the work stations 14 may well be capable of being operated continuously, sequentially on successively presented bodies 16.

Further alternative constructions of details, still embodying the invention, will now be briefly described. FIG. 8 shows in enlarged end view an expedient for supporting a half-cylindrical supporting carriage 40 in a tube 3 (or 6), the latter being similar to those shown in FIGS. 1-7. The carriage 40 is adapted to carry a radioactive body or bodies 16 (which may be an irradiated reactor fuel pin) within a recess 41 in its diametral surface. The carriage 40 also has a plurality of paramagnetic metal bars 42 extending longitudinally and equally spaced around the curved part near the surface thereof. The tube 3 (or 6) has at least three air or other gas inlets 43 equiangularly spaced around that part of the tube which registers with the curved part of carriage 40. Air or other gas is fed in constantly to cause levitation of the carriage 40, and electromagnetic coils 44 similar to those provided in projections 23 of the previously described embodiment are provided for moving the carriage 40 along the tubes 3, 6.

Figure 9:
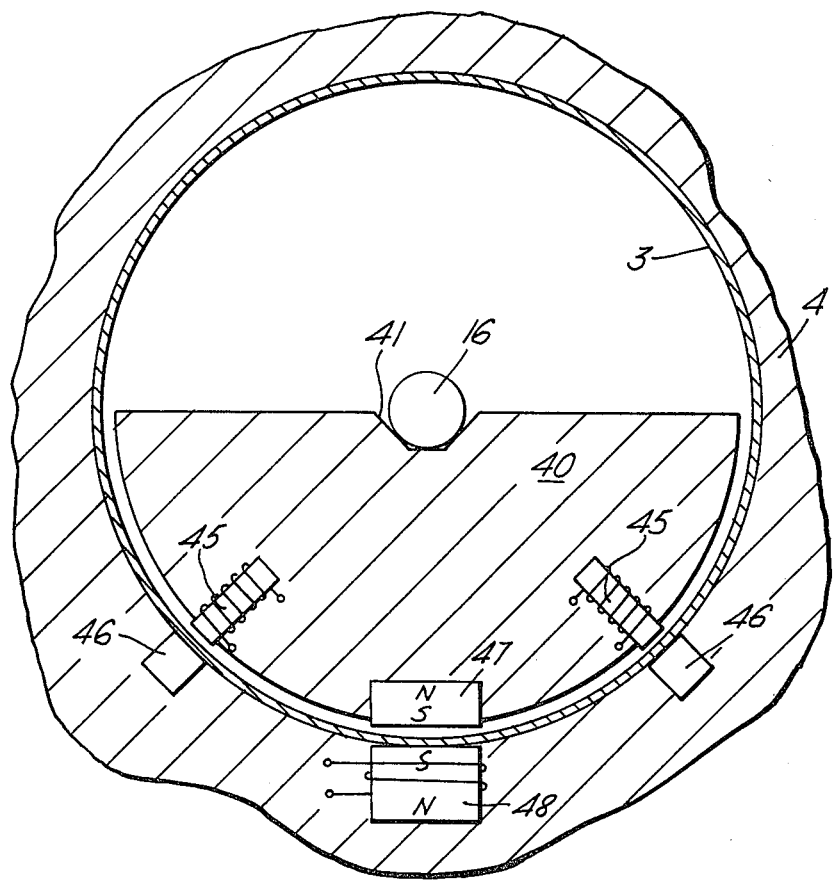
FIG. 9 is a similar view to FIG. 8, illustrating a further alternative.

FIG. 9 shows a similar type of carriage 40 in a tube 3 (or 6) but instead of bars 41 it has built-in propulsion coils 45 with current pick-up from sliding contacts (not shown) and current bars 46 to give a linear motor type of drive. A magnet 47 at the lowermost part of carriage 40 registers with an electromagnetic 48 at the bottom of tube 3 (or 6) to provide levitation of the carriage 40 by magnetic repulsion.

Figure 10:
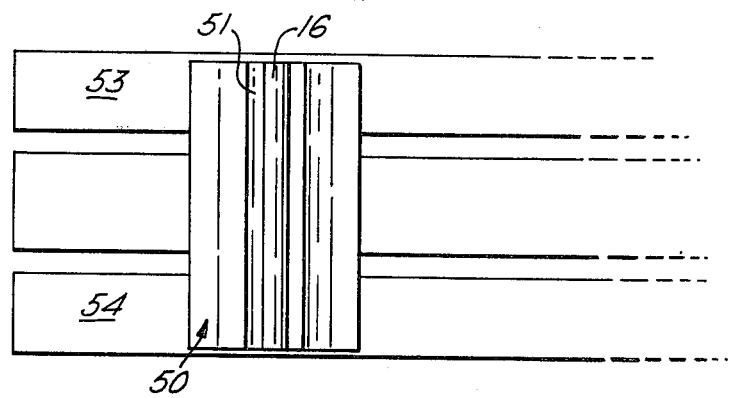
FIGS. 10 and 11 are plan views of still further alternatives.
Figure 11:
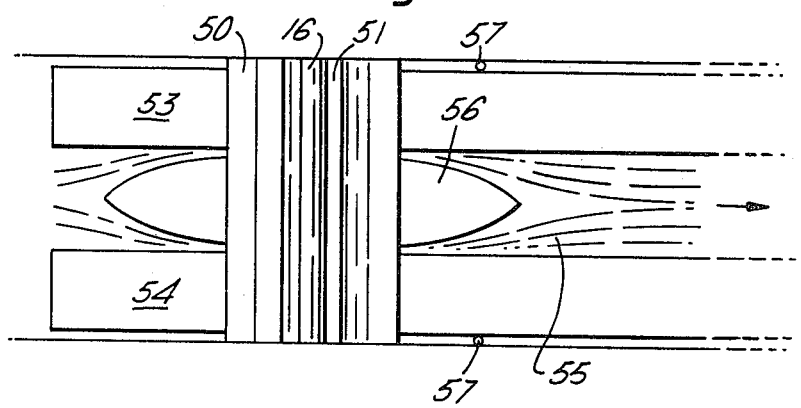

FIG. 10 shows a platform type of carriage 50 having a stirrup 51 for a radioactive body 16, the platform carriage 50 being levitated by either magnetic, electromagnetic or gas pressure at a centre region and spaced linear motors 53, 54 with feed-back for correcting platform skew. FIG. 11 is similar to FIG. 10 but has a liquid canal 55 and a floating barge 56 on which the platform carriage 50 is mounted, drive being by linear motors 53, 54. This embodiment also shows a pair of stop pegs 57 for stopping the platform carriage opposite a work station 14, the pegs being retractable to free the carriage 50 for movement to the next work station.

The main advantage seen in the present invention is the maintenance of the 'active volume' inherent in the system to as small a quantity as possible, being many times less than the volume of an equivalent facility which involves caves. Because of this, the problems associated with large volumes of contaminated atmosphere or active components are largely reduced. Furthermore, the problems of repair and maintenance are greatly reduced with the big decrease in scale. Also the relatively small size of the facility reduces problems with the remote operation of equipment and transport and it can be arranged that human operators need not work close to the facility.

We claim:

1. Facility for the examination of radioactive bodies comprising a movable carriage having means for supporting and transporting at least one radioactive body, a relatively thick radioactive shield having the property of shielding substantially all radioactive emissions, said shield surrounding and defining a shielded passage forming a path of travel for the carriage and having a transverse dimension to substantially fit about a corresponding dimension of the carriage, a plurality of examination stations spaced along the path of travel with said stations being confined within the dimensions of the shielded passage, examination equipment for said stations located outside the said shield at each examination station and in communication with its respective examination station within the shielded passage and means for moving the carriage along the shielded passage.

2. Facility according to claim 1 in which the passage comprises a plurality of abutting shielded tubular units disposed end-to-end with intervening sealing means.

3. Facility according to claim 2 in which the tubular units comprise alternate examination and service stations and means for the selective removal and replacement of individual units.

* * * * *